Jan. 8, 1935.   F. W. SPERR, JR   1,986,899
PROCESS FOR PRODUCING AMMONIUM SULPHATE
Filed Jan. 18, 1929   2 Sheets-Sheet 2
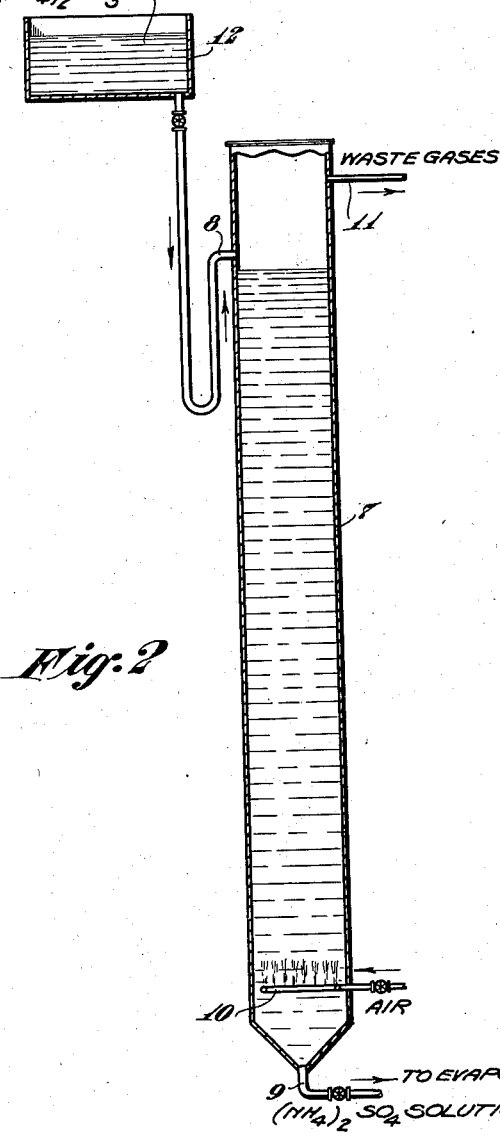
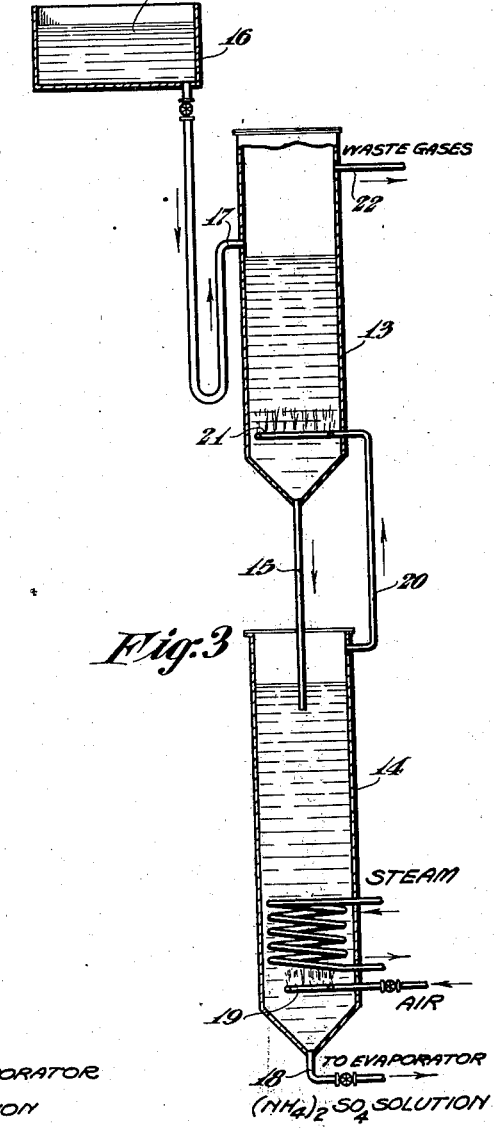
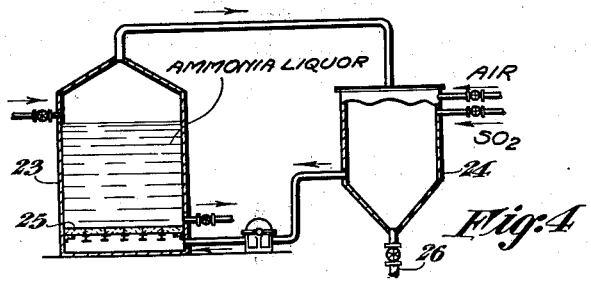
INVENTOR.
Frederick W. Sperr Jr.
BY Jesse R. Langley
ATTORNEY.

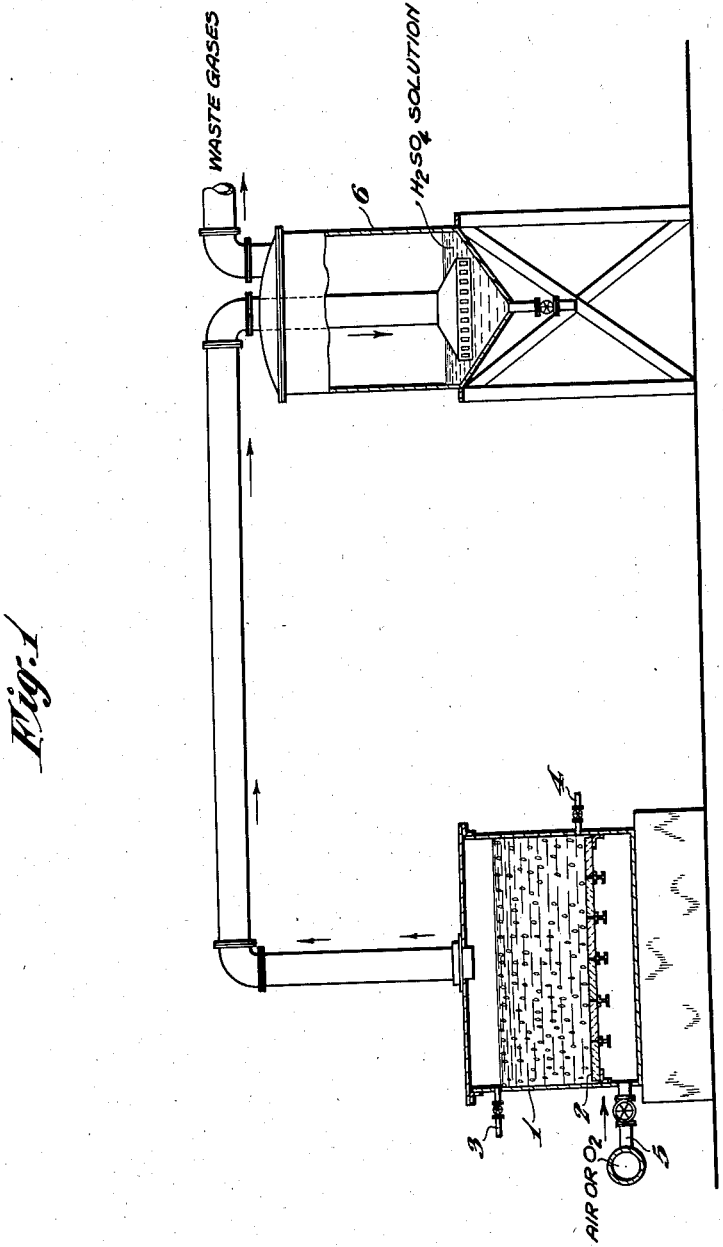

Patented Jan. 8, 1935

1,986,899

UNITED STATES PATENT OFFICE 1,986,899

PROCESS FOR PRODUCING AMMONIUM SULPHATE

Frederick W. Sperr, Jr., Pittsburgh, Pa., assignor to The Koppers Company of Delaware, a corporation of Delaware Application January 18, 1929, Serial No. 333,266

5 Claims. (Cl. 23—119)

This invention relates to a process and apparatus for oxidizing ammonium sulphite to produce ammonium sulphate, and more particularly to the manufacture of ammonium sulphate from ammonia liquors, and waste gases containing sulphur dioxide.

It has been found that in the treatment of ammoniacal solutions, or more particularly ammonium sulphite solutions, with gases to produce ammonium sulphate, greater yields of the latter are obtained from solutions of certain concentrations and when the gases in finely comminuted state are commingled with the solutions. It has also been found that the yields are dependent somewhat on the rate at which the gases are passed through the solutions.

Solutions of ammonium sulphite of various concentrations of up to 20% or more may be used in this process, but it has been found that the best results are obtained with solutions containing from about 10% to about 20% ammonium sulphite. The rates at which the oxidizing gases are passed into the solution are given by way of example and not by way of limitation. A range of rates which appear to give good results, is from about 35 cubic feet per hour per gallon to about 300 cubic feet per hour per gallon. An intermediate rate of about 140 cubic feet per hour per gallon appears to give very favorable results. It will be appreciated that the most desirable rate will vary with the type and size of apparatus.

Various types of apparatus may be used in connection with the process of this invention. Examples of suitable apparatus are shown in the accompanying drawings in which Fig. 1 is a view partly in vertical section and partly in elevation of one form of apparatus;

Fig. 2 is a similar view of another form of apparatus; and

Figs. 3 and 4 are similar views of further modifications.

In Fig. 1 an arrangement is shown in which there is a closed tank 1, provided with a gas comminuting device such as a porous plate, of earthenware or filtrose, extending horizontally across the interior of the tank and placed a short distance above the bottom thereof to permit the entrance of the oxidizing gas through the pipe 5 into the tank 1 below the plate 2. The solution to be treated, as for instance ammonium sulphite solution, is placed in the tank 1 above the porous plate 2, inlet means 3 and outlet means 4 for the solution being provided in the side of the tank 1.

The oxidizing gas passes through the plate 2 and, in finely comminuted form, passes upwardly through the solution. Gases and vapors collecting above the surface of the solution are led into a saturator 6 containing sulphuric acid of proper concentration to remove any ammonia which may have been carried over from the tank 1. The acid in the saturator 6 is subsequently treated for the recovery of additional ammonium sulphate.

Instead of the plate 2 a mechanical agitator may be employed in the tank 1 for commingling the oxidizing gas with the solution.

The reaction that takes place appears to be:

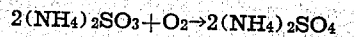
$$2(NH_4)_2SO_3 + O_2 \rightarrow 2(NH_4)_2SO_4$$

Alternatively, apparatus such as that shown in Figs. 2 and 3 may be used in connection with the process of this invention.

In Fig. 2 a tall tower 7, 20' to 60' in height and of relatively small diameter, is provided at the top with inlet means 8 for the ammonium sulphite solution and at the bottom with outlet means 9 for the ammonium sulphate solution. The oxidizing gas passes into the solution at the bottom of the tower through a perforated pipe 10, preferably ring shaped. The waste gases are passed out of the top of the tower through the pipe 11.

In the operation of the apparatus shown in Fig. 2, the ammonium sulphite solution is led from tank 12 through pipe 8 and into the top of the tower 7. The tower is kept almost full and the solution is permitted to flow out through pipe 9 at a rate such as to ensure the oxidation of the bulk of the ammonium sulphite. The air is forced into the solution through the perforated pipe 10, preferably at a pressure great enough to overcome the resistance encountered by the air in the column of liquid above the perforated pipe 10. In this apparatus a counterflow process is used which is peculiarly efficient in that there is little or no loss of ammonia and less air is necessary to bring about complete oxidation. The ammonium sulphate solution coming from the bottom of the tower through pipe 9 may be treated in any desirable manner to obtain the ammonium sulphate.

As shown in Fig. 3, a combination of towers, preferably two similar to that shown in Fig. 2, may be employed. Towers 13 and 14 are placed preferably one above the other and connected by a pipe 15, so that the ammonium sulphite solution passing from the supply tank 16 through pipe 17 into the top of the upper tower 13, passes downwardly through the pipe 15, into the top of the lower tower 14, and the ammonium sulphate solution formed by the oxidation is passed out of the bottom of the tower 14 through pipe 18 to an evaporator.

The air used for oxidizing the ammonium sulphite passes into the solution at the bottom of the lower tower 14 through the perforated pipe 19, upwardly through the solution, out of the top of the tower 14, through pipe 20, and into the solution in the tower 13 through a perforated pipe 21. Waste gases are passed out of the top of the tower 13 through pipe 22. The air is passed into pipe 19 at a pressure great enough to overcome the resistance encountered by the air in the column of liquid above the perforated pipe 19, and that in the column of liquid above the perforated pipe 21.

The rate at which the air is led into the solution is so controlled as to produce satisfactory results. The rate depends on the temperature and the concentration of the solution treated, and on the rate of flow of the solution down through the towers.

The apparatus shown in Fig. 3 is arranged to provide for the heating of ammonium sulphite solution and also to prevent any loss of ammonia due to such heating. A steam coil may be placed in the solution in the lower tower near the bottom and preferably out of the path of the oxidizing gas passing upwardly through the liquid. The liquid in tower 14 may be heated to any desired temperature up to boiling. The solution in the upper tower 13 is kept at normal temperature and may be cooled, if desired, by the use of a cooling coil.

The process of this form of my invention is particularly adapted to the production of ammonium sulphate from ammonia liquors, and waste gases containing sulphur dioxide. In this case, the waste gases containing sulphur dioxide are led into the ammonia liquors to produce ammonium sulphite. The ammonium sulphite is oxidized to ammonium sulphate by passing a finely comminuted gas containing free oxygen into the solution of ammonium sulphite and commingling the gas therewith. The gas is then led into a saturator containing sulphuric acid of about 66° Bé. to convert any entrained ammonia into ammonium sulphate. The ammonium sulphate produced is separated from the solution by evaporation of the liquid and the well known processes of crystallization and filtration or centrifuging.

Alternatively, the sulphur dioxide is mixed with air and the mixture led into the ammonia liquors, thereby oxidizing the ammonium sulphite as soon as formed in the reaction of the sulphur dioxide with the ammonia.

In Fig. 4 an apparatus is shown in which a batch treatment may be employed and the gas recirculated through the solution to be treated. This type of apparatus is particularly adapted to the treatment of ammonia liquors simultaneously with air and sulphur dioxide to carry out the reaction from ammonia to ammonium sulphite and then to ammonium sulphate in one operation. The ammonia liquors are placed in a tank 23, similar in construction to the tank 1 shown in Fig. 1. A mechanical agitator may be substituted for the porous plate 25. A tank 24 is filled with a mixture of gases containing oxygen and sulphur dioxide. A small excess of sulphur dioxide and a larger excess of oxygen are preferable. For example, about four times the amount of air necessary to complete the reaction may be used.

The gases are preferably kept under pressure, for example at about 100 pounds or more, and are pumped into the tank 23 below the plate 25 and upwardly through the ammonia liquor out of the top of the tank 23, back into the tank 24 and then recirculated. The solution that is carried over by the gases and entrained in the tank 24 is drawn off by opening the valve 26. The reaction in this type of apparatus is completed in a comparatively short time.

In the production of ammonium sulphate from gas liquor containing free ammonia, ammonium salts, in the form of carbonates, sulphides, etc., and various tarry and oily substances, ammonia is preferably distilled off and collected in the usual manner. The ammonia solution thus obtained is then treated in accordance with the process of this invention to produce ammonium sulphate.

Apparatus such as that shown in Figs. 2 and 3 are particularly efficient in connection with the process of this invention. Owing to the pressures existing in the towers described, the gases need not be as finely comminuted as when introduced into an apparatus such as that shown in Fig. 1 wherein the body of liquid treated is relatively shallow. Furthermore, the aforesaid towers ensure better contact of liquid and gas than towers into which the liquid is sprayed or in which the gas merely passes over the surface of the liquid, or in which the gas is passed through shallow bodies of liquids.

The apparatus and process of this invention give highly improved results. Under proper conditions almost complete oxidation of ammonium sulphite can be accomplished.

I claim as my invention:

1. A process comprising introducing oxidizing gas under pressure into the lower portion of a tall narrow column of about 20 to 60 feet in height of liquid containing ammonium sulphite and thereby effecting the oxidation of ammonium sulphite to ammonium sulphate with oxidizing gas.

2. A process comprising introducing finely comminuted oxidizing gas into a deep column of about 20 to 60 feet in height of ammonium sulphite solution and thereby effecting the oxidation of ammonium sulphite to ammonium sulphate with oxidizing gas.

3. In a process of producing ammonium sulphate from ammonium sulphite with an oxidizing gas, the step of finely comminuting the oxidizing gas within a deep column of about 20 to 60 feet in height of a solution of ammonium sulphite.

4. In a process of oxidizing ammonium sulphite to ammonium sulphate by means of an oxygen-containing gas, the improvement which comprises maintaining a deep column of about 20 to 60 feet in height of ammonium sulphite solution, and introducing the oxygen-containing gas to the lower portion of said column by passing said gas through a porous septum in contact with said solution.

5. In a process of oxidizing ammonium sulphite to ammonium sulphate by means of an oxygen-containing gas, the improvement which comprises maintaining a deep column of about 20 to 60 feet in height of ammonium sulphite solution, and introducing air to the lower portion of said column by passing the air through a porous septum in contact with said solution.

FREDERICK W. SPERR, JR.